Dec. 9, 1969  D. VOLK  3,482,904
METHOD AND APPARATUS FOR DETERMINING THE
ECCENTRICITY OF A CONICOID SURFACE
Filed Dec. 8, 1967  5 Sheets-Sheet 1

INVENTOR.
DAVID VOLK
BY
Baldwin, Doran & Egan
ATTORNEYS

Dec. 9, 1969
D. VOLK
3,482,904
METHOD AND APPARATUS FOR DETERMINING THE ECCENTRICITY OF A CONICOID SURFACE
Filed Dec. 8, 1967
5 Sheets-Sheet 5
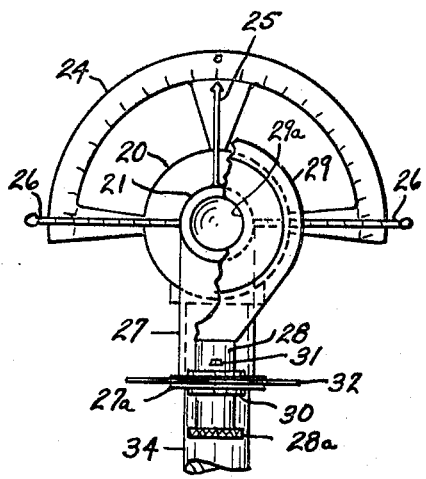
Fig. 7
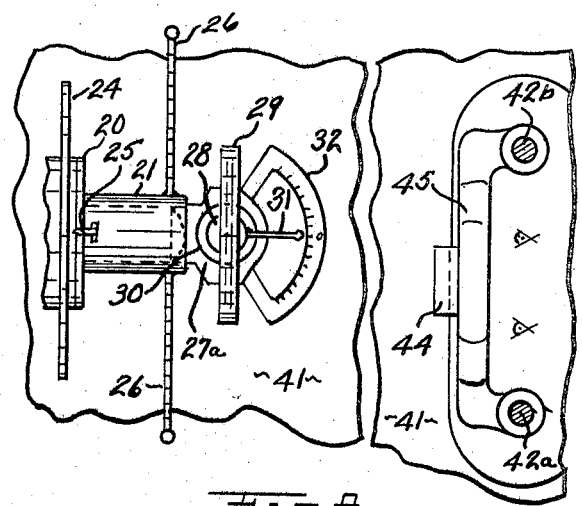
Fig. 8
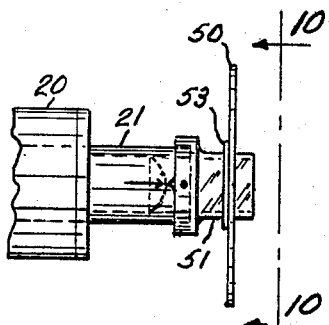
Fig. 9
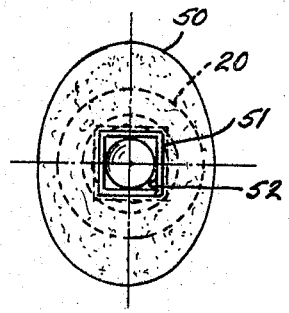
Fig. 10
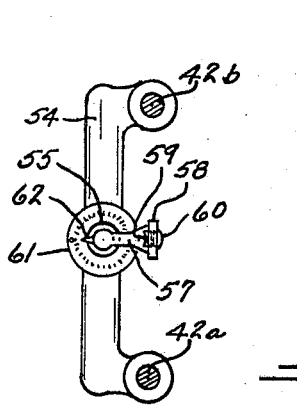
Fig. 11
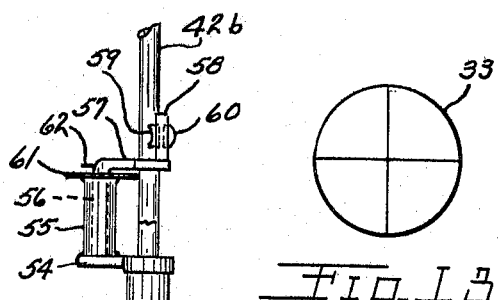
Fig. 12
Fig. 13
INVENTOR.
DAVID VOLK
BY
Baldwin, Doran & Egan
ATTORNEYS United States Patent Office 3,482,904
Patented Dec. 9, 1969

3,482,904
METHOD AND APPARATUS FOR DETERMINING THE ECCENTRICITY OF A CONICOID SURFACE
David Volk, 2460 Fairmount Blvd., Cleveland, Ohio 44106
Filed Dec. 8, 1967, Ser. No. 689,164
Int. Cl. A61b 3/10
U.S. Cl. 351—6     5 Claims

ABSTRACT OF THE DISCLOSURE

There is presented a method and apparatus for determining the eccentricity of a conicoid surface, either of a human cornea or of a lens, by reflecting from a non-apical portion of said surface the image of a target, which target is equivalent to a projection of a circle oriented at an angle about a diameter thereof, said image viewed from a telescope whose optical axis originally coincides with the axis of revolution of the conicoid, the conicoid surface being then rotated a fixed angle about a point on its axis of revolution between the center of curvature of its apex and a point about 1.5 times its radius of apical curvature to present said non-apical portion to the telescope, said circle diameter aligned with, and at right angles to, and centered upon said telescope optical axis, such orientation being determined by that projection where said target image appears as substantially a circle, and using such angle of orientation to determine the eccentricity of the conicoid surface.

---

This invention relates to a method and apparatus for determining the shape of the anterior surface of the human cornea in terms of the eccentricity of conicoids of revolution which approximate the shape of the cornea. This invention is also used to determine, with a relatively high degree of accuracy, the eccentricity of conicoids of revolution comprising the negative or corneal surface of contact lenses designed to match the shape of the cornea, as well as the eccentricity of conicoids of revolution of the opposite surface of said lenses. These contact lenses are described in my copending patent application, "Aspheric Contact Lens Series," Ser. No. 492,408, filed Oct. 4, 1965.

It is known that the anterior surface of the human cornea is not spherical, but tends to decrease in curvature from the most highly curved portion centrally, to the periphery. The known corneal shapes can be closely approximated by conicoids of revolution, including prolate ellipsoids, paraboloids, and hyperboloids of revolution. In those instances where the cornea has two principal meridians, each principal section may resemble a conic. As a consequence of the similarity in shape of the cornea to conicoids of revolution, and to resembling surfaces with two principal meridians, each principal section of which resembles a conic, one is justified in specifying the shape of the cornea, in one or more principal directions, in terms of eccentricity. Hereinafter, I will describe the shape of the cornea in terms of eccentricity, or in terms of the eccentricity in one or both of the principal meridians.

In the drawings:

FIG. 7 is a fragmental front elevation of the same apparatus taken from the line 7—7 of FIG. 6;

FIG. 8 is a fragmental top plan view of the same apparatus taken from the line 8—8 of FIG. 6;

FIG. 9 is a fragmental side elevational view of a modification at the front end of the telescope of FIG. 6 for carrying out the second embodiment of this invention;

FIG. 10 is a fragmental front elevational view of the modification of FIG. 9;

FIG. 11 is a fragmental top plan view of a modification of the chin rest of FIG. 6 to hold a lens having a conicoid surface;

FIG. 12 is a fragmental side elevational view of the modified chin rest of FIG. 11;

FIG. 13 is a view of a reticle, enlarged, near the eye piece of the telescope of FIG. 6; while

In order to simplify the description of this invention, it will be assumed that the anterior surface of the human cornea is a surface of revolution. Later, the specification will take into account those instances in which the cornea is not a surface of revolution, and in which there are two principal meridians.

The image of a target, produced by reflection from the non-spherical front surface of the cornea, is non-uniformly magnified, increasing in magnification toward the corneal periphery in a continuous and regular manner. Substantially the same effects are obtained when the aforementioned conicoids of revolution are used as mirror surfaces. It is thus possible to relate qualitatively and quantitatively the distortion effects of images produced by reflection from the front surface of the cornea, to the distortion effects of images produced by conicoids of revolution of known eccentricities.

This invention discloses a method and apparatus which quantitates the amount of image distortion produced by reflection of a regular geometrically shaped target from an off-axis portion of a non-spherical surface, such as the cornea, by modifying the shape or position (with respect to the eye) of the target in such manner, that its image produced by said area of said surface, is seen to be its axially reflected simple and regular geometrical shape. The amount of target modification, either in shape or position, required to produce said image by said area, is used to indicate the eccentricity of the surface measured.

Figure 1:
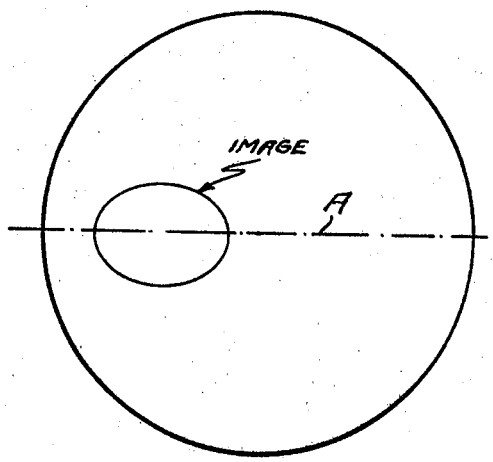
FIG. 1 is a diagrammatic showing of the off-center corneal image of a circular target.

As an example of image distortion produced by reflection from the cornea, consider a target in the form of a circular disc which faces the more peripheral portion of the cornea. The corneal image of a circular target, as viewed through an opening in the center of the circular disc target, will appear substantially elliptical, with the long or major axis of said substantially elliptical image directed toward the corneal apex. (See FIG. 1). The type of distortion depicted in FIG. 1 is that produced by almost all corneas and also produced by conicoids of revolution of the type mentioned previously. The greater the eccentricity of the conicoid, and the greater the eccentricity of the cornea, the more rapidly does the distortion manifest itself as the area of the reflecting surface involved in image formation and observation moves peripherally from the apex of said surface. This procedure is described as a preferred embodiment of this invention.

In said first and preferred embodiment of this invention, the method and apparatus used to obtain the effect of an asymmetric target utilizes a circular disc as the target for the corneal periphery, but the disc is oblique to a normal direction to said corneal periphery. The obliquity is obtained by rotating the disc about a diameter, said diameter of said disc being perpendicular to a meridian plane of the cornea. As the disc is rotated about said diameter, the non-circularity of the corneal image of the disc formed by the periphery of the cornea having eccentricity and viewed through an opening in the center of the disc, is gradually reduced as the disc is rotated, until at a specific amount of rotation, the image appears substantially circular. The greater the eccentricity of the cornea, the greater the distortion it produces and the greater is the amount of rotation of the disc required to cause the corneal image to appear circular.

Figure 2:
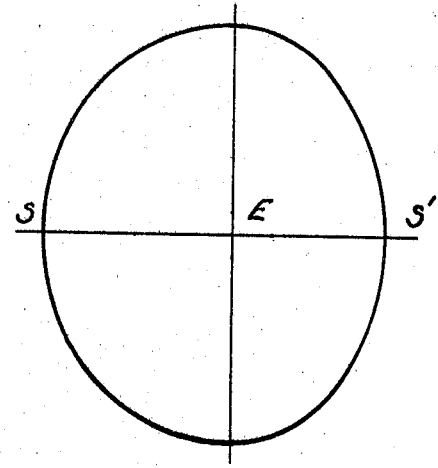
FIG. 2 is a target capable of reflecting a circular image from a cornea or other conicoid surface.
Figure 3:
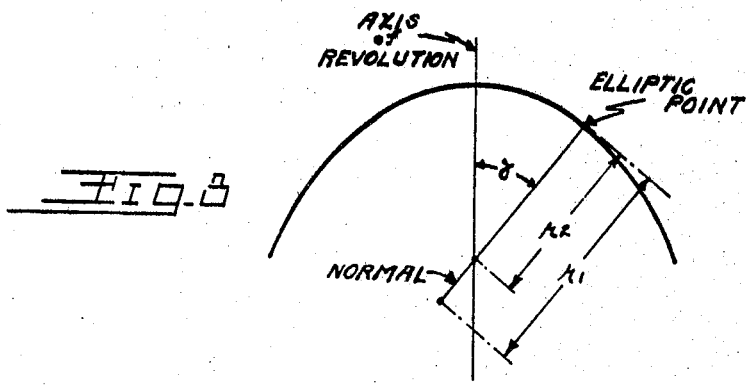
FIG. 3 is a diagrammatic view of a meridian section of a conicoid, illustrating the relationship between $r_1$, $r_2$ and $\gamma$ at an elliptic point.

In a second embodiment, the substantially elliptical image of the circular target of the first embodiment symmetrical about a meridian plane of the cornea, has as its counterpart the circular image of an oval target, said oval target being asymmetric in a meridional direction and symmetric about said meridian plane. As an example of such an oval target, consider a target in the form of an oval resembling two semi-ellipses joined at a common major axis, the two semi-ellipses differing in eccentricity. Such a target, shown in FIG. 2, when presented to the corneal periphery, with the line SS' coinciding with a meridian of the cornea and point S' being toward the periphery of the cornea, will also provide a distorted image of itself on the cornea, as viewed from the target, but in this instance the distortion is such as to cause the image to appear circular in outline. The greater the eccentricity of the cornea, the greater the distorting effect of the corneal periphery, so that in order to obtain circular images from the periphery of corneas of high eccentricity, the asymmetry of the oval target would have to be great.

In this second embodiment of this invention, the method and apparatus utilizes a series of oval shaped targets, each successive oval in the series increasing in asymmetry, and each of said ovals representing the target which when presented to a predetermined zone of a cornea of a specific eccentricity, under standard test conditions, results in a circular image as seen from the target. When the apparatus of the second embodiment of the invention is used to determine the eccentricity of the cornea, successive ovals are presented to the corneal periphery until the one which causes the corneal image to appear circular in outline is obtained.

The anterior surface of the cornea is defined as a cup shaped surface, with all curvatures positive. When the cornea is a surface of revolution, resembling conicoids, it will have an apical umbilical point, or non-astigmatic point. Elsewhere, all points on the surface are elliptic points, or astigmatic points. An image of a small circular target, produced by reflection from an area of the cornea in the immediate vicinity of an umbilical point, si circular, whereas an image produced by reflection from an area of the cornea in the immediate vicinity of an elliptic point, is substantially elliptical. Said substantially elliptical images, hereinafter referred to as elliptical, signifies that magnification in the two principal directions of said elliptic point is unequal.

At any elliptic point, there are two principal directions and two principal curvatures, with the longest radius of curvature defined as $r_1$, and the shortest as $r_2$. In the first principal meridian of an elliptic point, of radius $r_1$, one may write, by the mirror equation:

$$\frac{y_1'}{y} = -\frac{u_1'}{u} \quad (1)$$

where $y$, the object size, is the diameter of a small circular target, $u$ is the object distance, $y_1'$ is the image size in the first principal meridian, and $u_1'$ is the image distance.

In the second principal meridian of said elliptic point, or radius $r_2$, one may write $$\frac{y_2'}{y} = -\frac{u_2'}{u} \quad (2)$$

Dividing Equation 2 by Equation 1, there is obtained:

$$\frac{y_2'}{y_1'} = \frac{u_2'}{u_1'} \quad (3)$$

When $u$ is large compared to $r_1$ and $r_2$, the mirror equation $1/u + 1/u' = 2/r$ may be written, with insignificant error, for each of the two principal meridians, as:

$$u_1' = \frac{r_1}{2} \quad (4)$$

$$u_2' = \frac{r_2}{2} \quad (5)$$

so that Equation 3 can be rewritten as:

$$\frac{y_2'}{y_1'} = \frac{r_2}{r_1} \quad (6)$$

Equation 6 may be stated as follows: The ratio of the image sizes corresponding to each of the two principal directions of an elliptic point on a mirror, for a small circular target at an object distance large compared to the radii of curvature in said principal directions, is proportional to the ratio of said radii of curvature.

For an elliptic point on a conicoid of revolution, i.e., a non-axial point of said conicoid, the ratio $r_2/r_1$ as said elliptic point is given by the equation:

$$r_2/r_1 = 1 - e^2 \sin^2 \gamma \quad (7)$$

where $r_2$ is the transmeridional radius of curvature at said elliptic point, and $r_1$ is the meridional radius of curvature, $e$ is the eccentricity of said conicoid of revolution, and $\gamma$ is the angle between the normal to said elliptic point and the axis of revolution of said conicoid.

Equation 7 may be written as:

$$e = \frac{(1 - r_2/r_1)^{1/2}}{\sin \gamma} \quad (8)$$

for values of $\gamma$ other than zero. For $r_2/r_1$ in Equation 8 there may be substituted $y_1'/y_2'$ from Equation 6, so that Equation 8 can be rewritten as:

$$e = \frac{(1 - y_2'/y_1')^{1/2}}{\sin \gamma} \quad (9)$$

Equation 9 is valid providing said circular target is extremely small and image distance $u$ is large with respect to $r_1$ and $r_2$ so that the area about said elliptic point involved in image formation is extremely small. Under these circumstances, the image produced by said non-axial elliptic point is elliptical and substantially symmetrical about said elliptic point, and $y_2'/y_1'$ is the ratio of the minor axis to the major axis of said elliptical image. Now if said small circular target is rotated about a diameter perpendicular to the meridian plane which contains the major axis of said elliptical image, it, in effect, becomes an elliptical target (for the eye) whose major axis is $y$, the diameter of said target, and whose minor axis is $y \cos \phi$, where $\phi$ is the angle which the plane of said target makes with a plane tangent to the conicoid surface at said elliptic point. By means of said rotation of said small circular target about said diameter so that it in effect becomes an elliptical target, the initial elliptical image produced by the cornea can be modified to appear as a circular corneal image when the ratio of the major axis to the minor axis of the effectively elliptical target becomes equal to the ratio of the major axis to the minor axis of the elliptical image produced by said circular target prior to its rotation. Since, for the given object distance $u$, $y'$ is directly proportional to $y$, the ratio of $y_2'/y_1'$ can be measured by the amount of said rotation of said circular target, where $y_2'$ is equal to $y_1' \cos \phi$, so that Equation 9 can be rewritten as:

$$e = \frac{(1 - \cos \phi)^{1/2}}{\sin \gamma} \quad (10)$$

Equation 10 can be considered the fundamental equation, which I have termed eccentroscopic, for measuring the eccentricity of a conicoid of revolution by means of the method and apparatus of this invention, the apparatus hereinafter being termed an eccentroscope.

In the practical application of the method and apparatus for the first embodiment of this invention for the measurement of eccentricity of a conicoid of revolution, the circular disc target is necessarily of a relatively large diameter so that its image can be readily seen through the telescope of the apparatus, and hence the area of the conicoid surface involved in the formation of the image is significant. Since the conicoid surface is decreasing in curvature from the apex to the periphery, the resulting elliptical image of said circular target is non-uniformly magnified, progressively increasing in magnification from the end nearest the corneal apex to the opposite end. Consequently, said elliptical image is not symmetrical about the normal through the elliptic point, said normal extending from the center of said circular target through said elliptic point. In order to obtain a circular image of said relatively large circular taget, it is necessary that target rotation, in effect, not only narrow the target in a meridional direction, but that it also, in effect, distort the target in a meridional direction so as to compensate for said progressive magnification of said conicoid surface. Said narrowing and said compensation both result from the appropriate rotation of the circular target, in which the edge of the target farthest from the axis of the conicoid is rotated away from the conicoid surface, see FIGURES 4 and 5.

Figure 4:
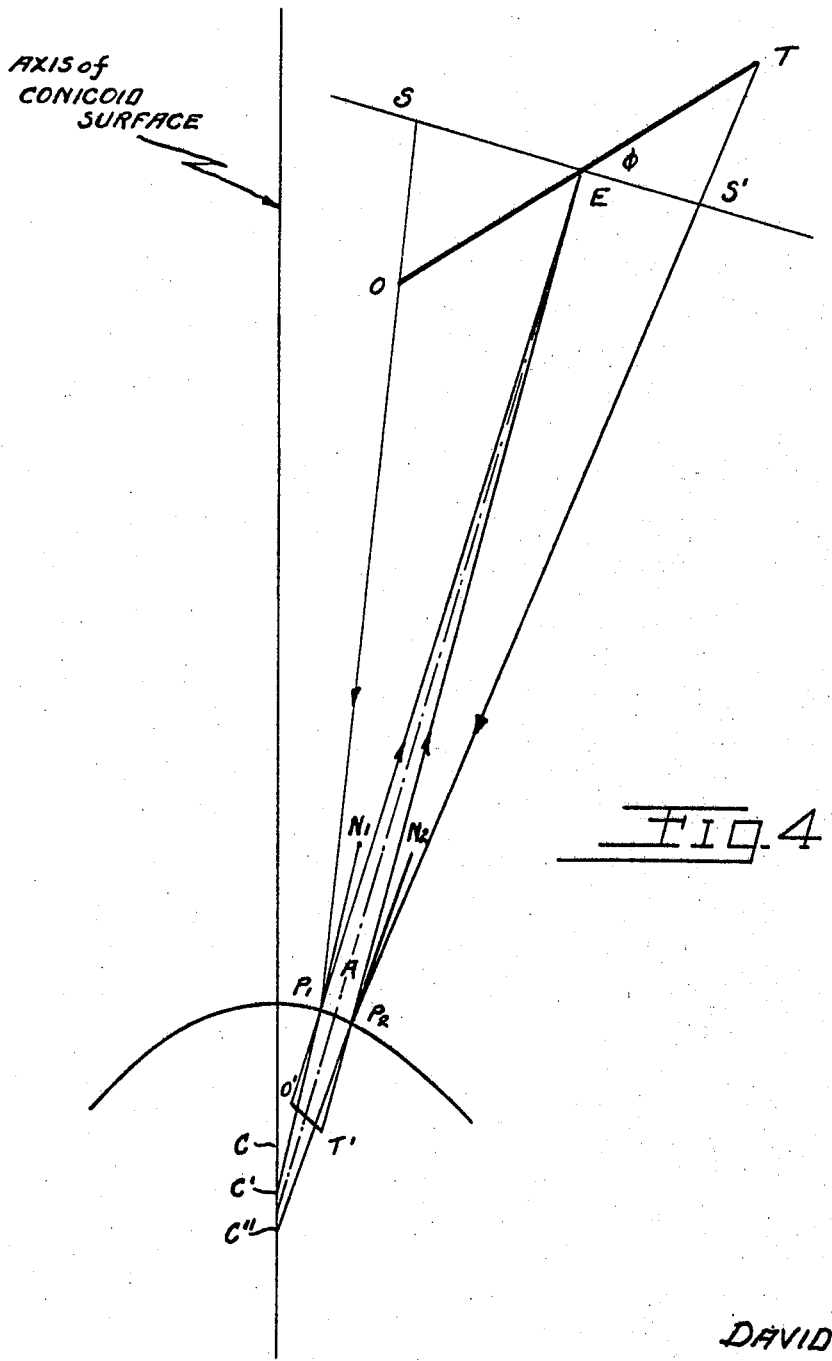
FIG. 4 is a schematic diagram of a circular target rotated to provide a circular image on a conicoid reflecting surface of positive curvature.
Figure 5:
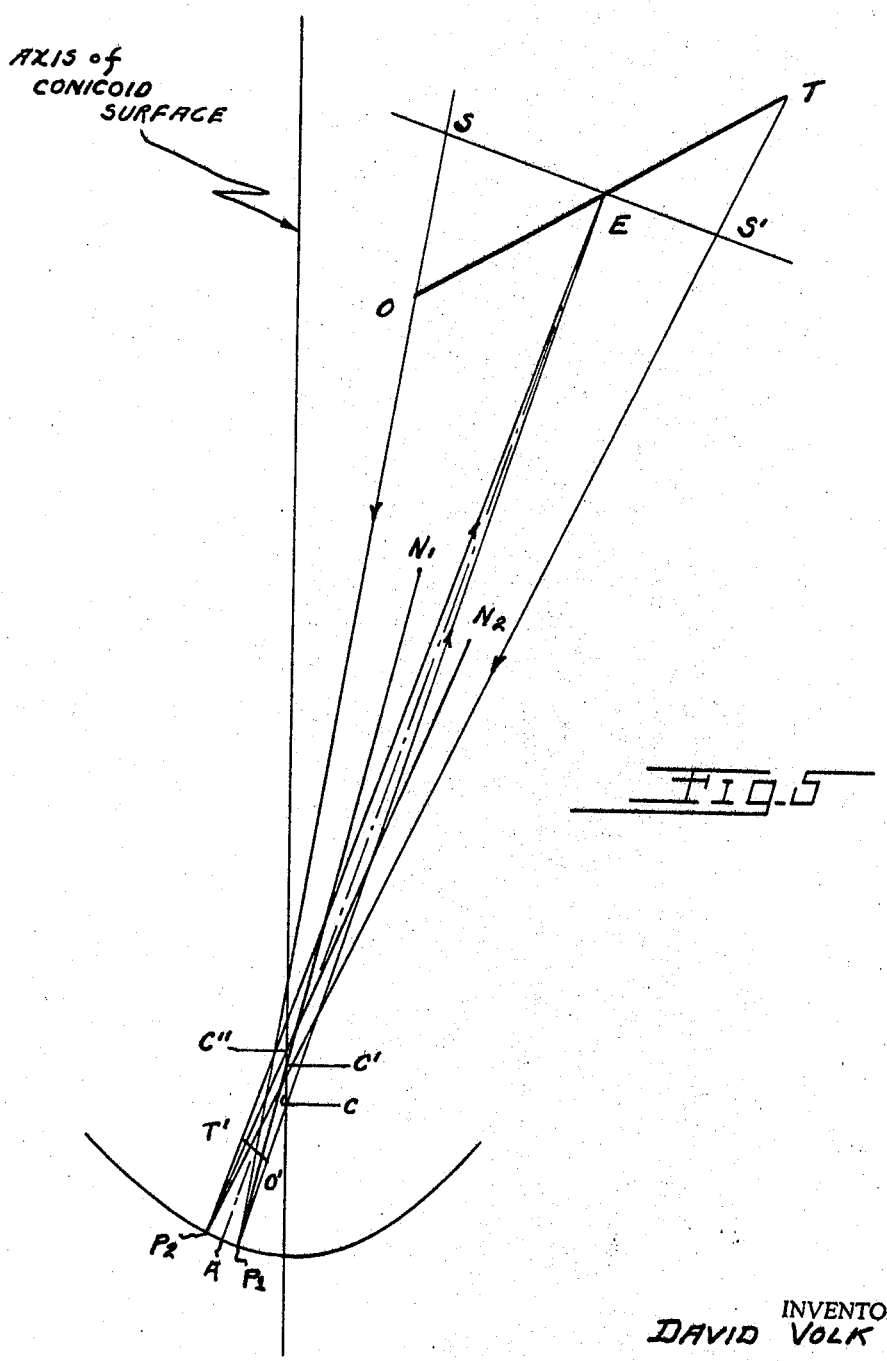
FIG. 5 is a schematic diagram of a circular target rotated to provide a circular image on a conicoid reflecting surface of negative curvature.

In FIG. 4, not drawn to scale, I have shown, schematically, a meridian section through a conicoid reflecting surface of positive curvature, and in FIG. 5 the same diagram for a surface of negative curvature. A discussion of FIG. 4 follows, it being understood that it applies to FIG. 5 also. The plane of said meridian section (the plane of the paper) is perpendicular to a circular target along a diameter OT, said target appropriately rotated so that it has the required compensation to produce a circular image, as viewed through the telescope, having a diameter O'T'. Assume that point E of FIG. 4 is the center of the entrance pupil of the telescope of the apparatus and that it lies at the center of the circular target.

By inspection of FIG. 4, it can be seen that angle $OP_1E$ for the half of the section through the rotated target nearest the conicoid reflecting surface is larger than the angle $EP_2T$ for the half of the section through the rotated target farthest from the conicoid reflecting surface. As an example, consider a cornea with an apical radius of curvature of 8 mm. and an eccentricity of 1. For eye rotation of 26°, a circular target 5 cm. in diameter, whose center is 15 cm. from the cornea, when rotated to produce a circular image as seen from the center of the target, involves an area of cornea about 1.5 mm. in diameter, which subtends an angle of about 0.6° to point E, the center of the entrance pupil of the telescope. This angle $P_1EP_2$ is quite small compared to angles $OP_1E$, 9.2°, and $EP_2T$, 7.9°, so that without significant error, tan $OP_1E$ may be considered equal to tan OAE, and tan $EP_2T$ may be considered equal to tan EAT. The following approximation may then be written:

$$\frac{\tan OP_1E}{\tan EP_2T} \simeq \frac{k + d \sin \phi}{k - d \sin \phi} \quad (11)$$

where $k$ is the distance EA from point E to the cornea, and $d$ is the semi-diameter EO of the target.

By inspection of Equation 11, it can be seen that for a given target distance $k$ and target rotation $\phi$, a very small value of $d$, wherein a very small area of the cornea is involved in the formation of the viewed image, results in the ratio of said angle tangents being nearly 1, the condition of minimum target compensation required to produce a circular corneal image. With a larger value of $d$ and a correspondingly larger area of cornea of progressively changing curvature involved in the formation of the image of said target, the ratio of said angle tangents increases such that the rotated target is, in effect, progressively distorted with respect to the conicoid reflecting surface so as to compensate of the progressive magnification of the image produced by said surface, enabling the production of a circular image.

For any given angle $\gamma$, the amount of rotation of the circular target to measure the eccentricity of a conicoid surface, is greater as the eccentricity of the surface is greater. With increased eccentricity, the distorting effect of the progressively changing curvature of the conicoid surface is greater. By inspection of Equation 11, it can be seen that as $\phi$ is increased for the higher eccentricity surfaces, the ratio of said angle tangents increases; hence the additional rotation of the target required for measuring said higher eccentricity surfaces, increases the effective distortion of said circular target with respect to the conicoid reflecting surface so as to compensate for the increased progressive magnification of said higher eccentric surfaces, thereby enabling the production of a circular corneal image.

Thus, as a result of the distortion compensating effect of target rotation, the fundamental eccentroscopic equation, Equation 10, remains valid even though a relatively large circular target is used.

As stated earlier, $\gamma$ is the angle between the axis of revolution of the conicoid and the normal through the elliptic point of said conicoid, extending from the center of the circular target. To present the target to an off-axis portion of the cornea, it is necessary that there be relative rotation of the eye with respect to the target, i.e., either the target rotates about a point within the non-rotating eye, or the target remains in one position while the eye rotates about its center of rotation.

If, to achieve angle $\gamma$, the target moves in an arc about the eye, the center selected for said arc can be a point on the corneal axis just behind the center of curvature of the corneal apex. When the target has been moved in an arc for a given angle $\gamma$, 25° for example, the target itself is then rotated about a diameter by an angle $\phi$, until its image as seen through the telescope of the apparatus appears circular. If the circular image is not approximately centered in the field of the telescope eye piece, then the target and attached telescope can be adjusted toward or away from the cornea, in a direction parallel to the line of sight of said eye, until the image is approximately centered in the telescope. Only a minimum adjustment, 1 mm. or less, may be all that is necessary. If said adjustment is made, then angle $\phi$ may be modified, if required, to produce a circular image. The error is negligible in any case.

If, as preferred, to achieve angle $\gamma$, the eye rotates while the target and telescope remain in one position, a small discrepancy arises if it is assumed that the angle which the eye rotates about its center of rotation is equal to $\gamma$. This discrepancy is negligible.

A small but negligible error in the achieving of angle $\gamma$ results from the fact that the line of sight of the eye does not coincide with the axis of revolution of the cornea, but is directed nasally about 5°, said angle being designated by the symbol $k$, with said line of sight intersecting the cornea approximately 0.5 mm. hasal to the corneal apex. Angle $k$ is taken into account and its effect reduced to a negligible amount by averaging the eccentricity values obtained for each half of a meridian. If greater accuracy is desired, then the value of $k$ is determined, by methods well known in the arts, and said value taken into account in the measurement of angle $\gamma$.

When the cornea has an elliptic point at its apex, i.e., is astigmatic where it is intersected by its axis of symmetry, the image of a circular target formed by the cornea about said elliptic point, will be elliptical. However, in most cases the image is only slightly elliptical so that the term "substantially circular" in the claims is intended to include this condition. For such a cornea, the determination of the eccentricity in each of the principal meridians follows the same procedure as in the case where the cornea is a surface of revolution, with the exception that for a given angle $\gamma$, instead of rotating the circular target until its image appears circular, it is rotated until its image appears to have the same elliptical shape as the elliptical image of a circular target formed by the corneal apex. When said elliptical image shape is used as the criteria for rotation of the circular target, the value obtained for the eccentricity in each meridian will be well within the degree of tolerances of corneal measurement required for the fitting of contact lenses.

Figure 6:
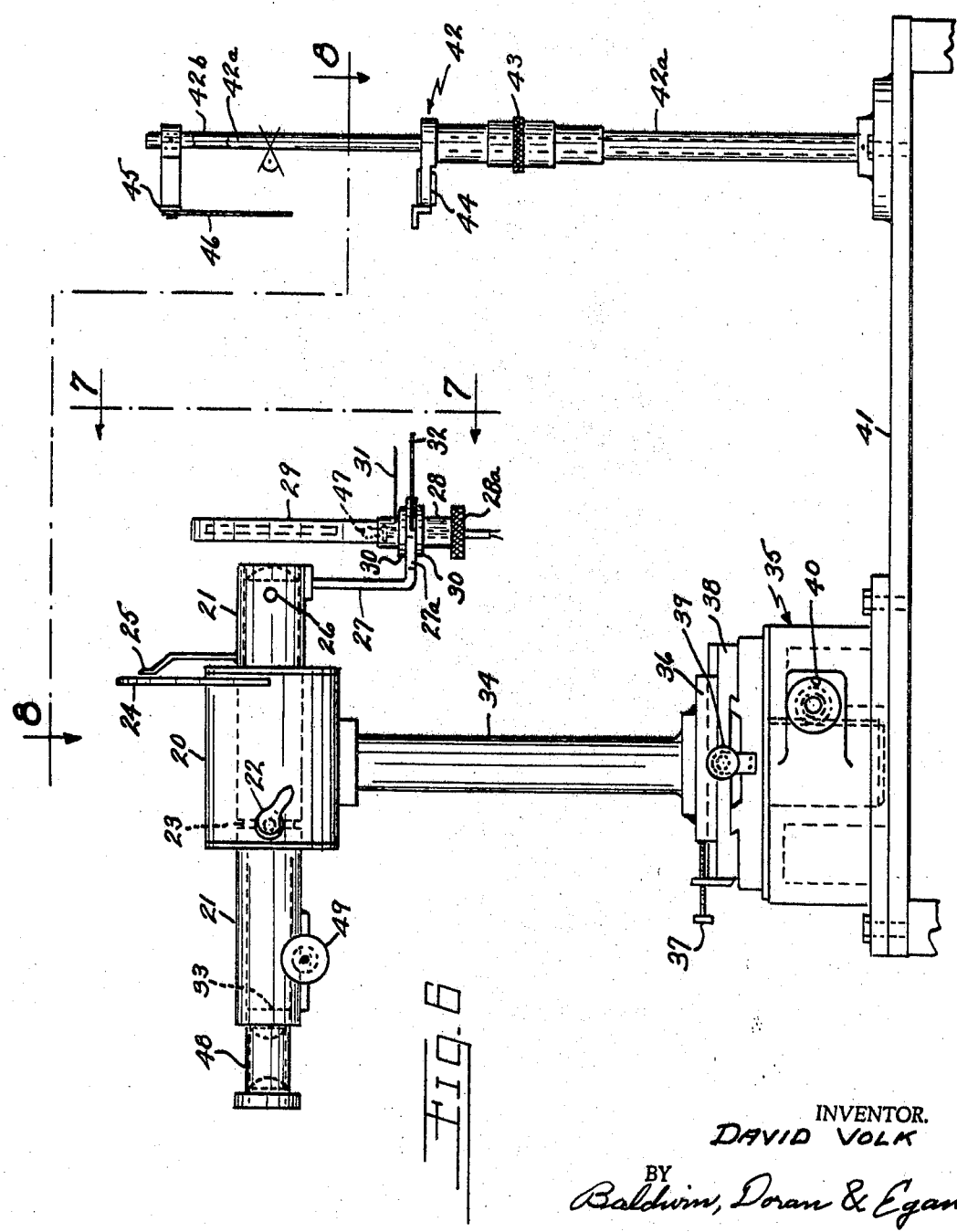
FIG. 6 is a side elevation of apparatus for determining the eccentricity of a conicoid surface according to the first embodiment of this invention.

Based upon the principles outlined, the first embodiment of the eccentroscope is made as follows: FIG. 6 is a side elevational view and FIGS. 7 and 8 are fragmental views of this first embodiment of the apparatus of this invention. Fixed housing 20 has a cylindrical bore snugly fit to the telescope 21 passing through said bore. The fit of the telescope within said bore is such that the telescope is capable of rotation about its optical axis to any predetermined angular position where it is locked in position at 22. Telescope 21 is prevented from movement in the direction of its optical axis within said bore by means of a pin at the end of 22 which fits into a groove 23 of the telescope. The angular position of said telescope about its optical axis is read on scale 24, fixed to housing 20, by means of pointer 25 which is fixed to the telescope. In the normal position of the telescope a fixation rod 26 extends horizontally from each side thereof near its front end. Pointer 25 is on the zero position of scale 24 when fixation rod 26 is horizontal. Also attached to said telescope and in generally coplanar relation to pointer 25 is arm 27, which is bent at right angles to form arm 27a. Arm 27a has a cylindrical bore through which passes cylindrical shaft 28, the axis of said bore and shaft 28 being perpendicular in FIG. 6 and intersecting the telescope axis. Suitably attached to shaft 28 is circular disc 29, a diameter of the face of said disc coinciding with the axis of shaft 28, while the geometrical center of the face of said disc is located on the optical axis of the telescope. A small circular area 29a, concentric to the center of said disc, has been removed to permit observation of the corneal image of said disc with telescope 21. Threaded washers 30 maintain the position of shaft 28 in the direction of its axis so that the center of the disc remains on the telescope optical axis, and they also help maintain the angular position of disc 29 after shaft 28 has been rotated at knob 28a. Shaft 28 and attached disc 29 are capable of rotation about the axis of said shaft by knob 28a.

Also rigidly attached to shaft 28 is pointer 31 which indicates the angular position of the face of circular target disc 29, by means of circular scale 32 which is fixed to arm 27a, the zero position being that in which the face of disc 29 is perpendicular to the telescope optical axis.

The telescope eye piece has a reticle 33 having crosshairs at 90 degrees as shown in FIG. 13. One crosshair is vertical when pointer 25 is in zero position on scale 24.

Housing 20 is rigidly mounted by post 34 to platform or base 35 and is capable of motion in three directions, by means of two pairs of horizontal ways and associated slides and one vertical threaded screw. One of the horizontal motions is in a direction parallel to the axis of the telescope and involves slide 36, and the other is in a direction perpendicular to the telescope axis and involves slide 38 controlled by screw 39. The vertical motion is controlled by worm 40. The motions are accurately controlled by means of threads in the slides and driving screws for moving the slides along the ways. Base 35 is fixed to table 41.

Extending vertically from table 41 is head and chin rest 44, as seen in FIGS. 6 and 8. On one of two vertical arms 42a and 42b of said rest is a screw adjustment 43 which can be used to raise or lower chin rest 44. Above chin rest 44 is forehead rest 45, from which extends occluder 46 which can be oscillated in front of either eye.

There will now be outlined in a series of steps the procedure for determining the eccentricity of the cornea with the first embodiment of this invention.

(1) The patient is seated at the apparatus of FIG. 6 with the head level and held firmly in position by means of head and chin rest 42, screw 43 being adjusted as necessary.

(2) Occluder 46 is adjusted to obstruct vision of the left eye.

(3) Target 29 is then illuminated by means of incandescent lamp 47 and the patient is asked to direct his gaze at the center of the circular aperture 29a of circular disc 29. After telescope eye piece 48 is adjusted to the zero position by means of knob 49, adjusting screws 37, 39 and 40 are then adjusted until the corneal image of circular disc target 29 as seen with the telescope is sharply focused and centered about the intersection of the cross lines of the reticle 33 of eye piece 48. The line of sight of the eye and the optical axis of the telescope will then coincide.

(4) If the corneal image of circular target 29 is circular, indicating no apical astigmatism of the cornea, or if previous ophthalmometry indicates no apical astigmatism, telescope 21 is rotated about its optical axis to the zero position, where it is locked in position by means of lock screw 22, thereby setitng fixation rod 26 horizontal. The patient is then asked to direct his gaze nasally to a designated point on said fixation rod, selected so that the rotation of the eye is 25°. The resulting elliptical corneal image of said circular target is observed with the telescope and sharply focused by adjustment of telescope eye piece 48, by rotation of knob 49.

(5) By means of knob 28a, target 29 is rotated such that its edge farthest from the apex of the cornea is rotated away from the eye, until the corneal image of said target disc as seen through telescope 21 appears circular. The amount of rotation of said disc as indicated on scale 32 is recorded.

(6) By means of knob 28a, target 29 is rotated to the zero position. The patient is asked to direct his gaze in the opposite direction, i.e., temporarily, to a designated point on said fixation rod 26, selected so that the rotation of the eye is 25°. The resulting elliptical corneal image of said circular target is observed with the telescope and sharply focused by adjustment of telescope eye piece 48, by rotation of knob 49. By means of knob 28a, target 29 is rotated as described in step 5, and the amount of rotation is recorded.

(7) Each of the values for the amount of target rotation, $\phi$, and the amount of eye rotation, $\gamma=25°$, are applied to Equation 10, and the two values obtained for eccentricity are averaged to obtain the approximate eccentricity in the meridian measured.

(8) By means of knob 28a, target 29 is rotated to the zero position. Lock screw 22 is loosened, telescope 21 is then rotated 90° about its optical axis and again locked in position with lock screw 22. Measurements of eccentricity are then made for each half of the vertical meridian in a manner similar to that outlined in steps (4), (5) and (6) of the procedure, the patient first looking upwardly 25° at the fixation rod and then downwardly 25°, and the data obtained is applied as in step (7), to obtain the approximate eccentricity in the vertical meridian. Measurements may be made in additional meridians, if desired. In general, when the cornea has no apical astigmatism, eccentricity in the various meridians will be close, so that the eccentricity of said cornea may be obtained by averaging the various values obtained.

(9) If, following step (3), the image of target 29 is elliptical, indicating apical astigmatism of the cornea, or if previous ophthalmometry indicates apical astigmatism, telescope 21 is rotated about its optical axis until fixation rod 26 coincides in direction with the meridian of least curvature of the cornea as indicated by the direction of the major axis of said elliptical image. This is achieved by observing the elliptical image through the telescope and rotating said telescope about its optical axis to that angular position at which the centered elliptical image appears symmetrical about the cross lines of reticle 33, with the cross line parallel to fixation rod 26 appearing to be in the estimated position of the major axis of said elliptical image. The angular position of the telescope, as read on scale 24, should correspond closely to the meridian of least curvature of the cornea as determined by previous ophthalmometry. The telescope is then locked in position by means of lock screw 22. The patient is then asked to direct his gaze to a designated point on fixation rod 26 so that the rotation of the eye is 25°, either to the right or left. The corneal image of said circular target is observed with the telescope and sharply focused by adjustment of telescope eye piece 48 by rotation of knob 49.

(10) By means of knob 28a, target 29 is rotated such that its edge farthest from the apex of the cornea is rotated away from the eye, until the corneal image of said target as seen through telescope 21 appears the same shape and oriented the same as the original central elliptical image. The amount of rotation of said target is recorded. In most cases this elliptical image will be substantially circular.

(11) By means of knob 28a, target 29 is rotated to the zero position. The patient is then asked to direct his gaze to the opposite side of fixation rod 26, to a designated point on said rod so that the rotation of the eye is 25°. The corneal image of said circular target is observed with the telescope and sharply focused by adjustment of telescope eye piece 48, by rotation of knob 49.

(12) Step (10) is repeated for this half of the meridian.

(13) Each of the values for the amount of target rotation, $\phi$, and the value of eye rotation, $\gamma=25°$, are applied to Equation 10, and the two values obtained for eccentricity are averaged to obtain the approximate eccentricity in the meridian measured.

(14) By means of knob 28a, target 29 is rotated to the zero position. Lock screw 22 is loosened, telescope 21 is rotated 90° and again locked in position with lock screw 22. The patient is then asked to direct his gaze to a designated point on fixation rod 26 so that the rotation of the eye is 25°. The corneal image of said circular target is observed with the telescope and sharply focused by adjustment of telescope eye piece 48 by rotation of knob 49.

(15) The remainder of the procedure for determining the approximate eccentricity in this meridian is as outlined in steps (10) through (13).

(16) Occluder 46 is adjusted to obstruct vision of the right eye. Steps (3) to (16) are then followed as necessary to determine the eccentricity or eccentricities of the left eye.

In the above series of steps the value of $\gamma=25°$ was arbitrarily chosen because it is a convenient angle for the measurement of eccentricity of the cornea with the eccentroscope. Other values of $\gamma$ may be used.

Although in the above series of steps I have utilized Equation 10 directly with the data obtained, a preferred simplification of the technique is to use a series of tables or graphs arranged so that for each of a series of values of $\gamma$, there is a listing or graph of the eccentricities associated with a wide range of values of $\phi$. Th examiner need only refer to the tables or graphs to obtain the eccentricity of each semi-meridian. In another procedure, one could have a scale 32 calibrated to read $e$ directly for the value of $\gamma$ being used.

In the second embodiment of this invention, instead of using a single rotatable circular disc as the target for the measurement of different eccentricities, I use a series of interchangeable targets, each of which corresponds to, and is effectively the same as, the circular disc target rotated some specific angle $\phi$, for a given angle $\gamma$, so that target rotation is not required for the determination of eccentricity. One of said targets is circular while all of the others comprise a series of ovals of gradually increasing asymmetry. The eccentroscope, in the second embodiment, therefore, is simplified in that arm 27 and all attachments, of the first embodiment, are eliminated. The oval targets 50 are properly positioned on the eccentroscope by being applied directly to a square shaped hollow sleeve 51, at the end of the telescope tube 21, the sleeve being so fixed on the telescope that the sides of the sleeve are symmetrical about the telescope axis and coinciding in direction with one or the other of the cross lines of reticle 33 of the telescope eye piece, as shown in FIGS. 6 and 13. The square opening 52 in the oval which snugly fits sleeve 51 is symmetrical about the "center" of the oval, said center being the intersection of the common major and both semi-minor axes of the semi-ellipses which are used to form said ovals. The sides of said square opening are parallel and perpendicular to said axes. When said ovals are placed on sleeve 51 and held firmly against abutment (or collar) 53, said centers of said ovals will lie on the optical axis of the telescope, the plane of said ovals will be perpendicular to said optical axis, with the major and minor axes of said ovals being parallel to the vertical and horizontal cross lines respectively of reticle 33, and said horizontal cross line being parallel to fixation rod 26. The plane of said target and its position with respect to the telescope objective lens is then the same as that of the circular target in its zero position in the first embodiment of this invention.

Referring to FIG. 4, and using the same approximations which were used to obtain Equation 11, the lengths of each pair of semi-minor axes, SE and SE', of the semi-ellipses which are joined at a common major axis of length $y$ (where $y$ is equal in length to the diameter of the circular disc target of the first embodiment of this invention), and also equals the diameter of the circular target of the interchangeable series of targets, may be calculated by the following equations:

$$SE \cong \frac{kd \cos \phi}{k - d \sin \phi} \quad (12)$$

$$S'E \cong \frac{kd \cos \phi}{k + d \sin \phi} \quad (13)$$

where $k$ is the distance EA of the center of the target from the cornea, and $d$ is the semi-diameter EO of the rotatable circular disc target of the first embodiment of this invention, upon which the design of the ovals are based, and $\phi$ is one of the series of angles through which said rotatable circular disc target is considered to be rotated when the values of SE and SE' are calculated.

As an example, consider the design of a series of ovals which would be required to measure the eccentricities of corneas, with eccentricities ranging from .4 to 1.4. If the ovals were designed to indicate eccentricities in steps of 0.05 eccentricity units, it would then be possible to estimate eccentricities lying between two of said eccentricities, i.e., to the nearest .025 eccentricity unit.

Figure 14:
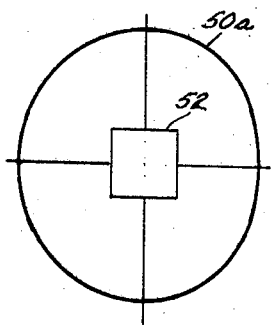
FIGS. 14, 15 and 16 represent oval targets for use in carrying out the second embodiment of this invention.
Figure 15:
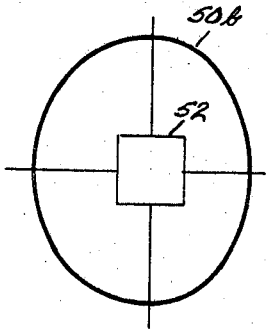
Figure 16:
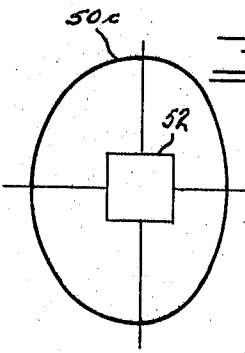

In Table 1, I have listed a series of eccentricities, the values of $\phi$ which in the first embodiment of this invention are associated with each value of eccentricity when $\gamma$ equals 25°, and the lengths of each pair of semi-minor axes, SE and SE', calculated by means of Equations 12 and 13 using the listed values of $\phi$ when the center of the target of 5 cm. diameter is 15 cm. from the cornea. In FIGS. 14, 15 and 16, I have shown the design of three ovals constructed from the data of Table 1. FIG. 14, when used as the target for the second embodiment of this invention, when γ equals 25° and the target center is 15 cm. from the cornea, will result in a circular corneal image as seen through the telescope when the corneal eccentricity is 0.7; FIG. 15 will result in a circular corneal image as seen through the telescope when the corneal eccentricity is 1.00; and FIG. 16, when the corneal eccentricity is 1.20. In use, each oval is designated and marked according to the eccentricity it indicates, for the given angle γ.

TABLE 1.—(γ=25°)

| Eccentricity | φ (degrees) | SE (cm.) | S'E (cm.) |
| --- | --- | --- | --- |
| .40 | 13.76 | 2.53 | 2.36 |
| .45 | 15.46 | 2.52 | 2.31 |
| .50 | 17.33 | 2.50 | 2.27 |
| .55 | 18.99 | 2.51 | 2.24 |
| .60 | 20.66 | 2.49 | 2.21 |
| .65 | 22.41 | 2.47 | 2.17 |
| .70 | 24.15 | 2.45 | 2.14 |
| .75 | 25.91 | 2.43 | 2.10 |
| .80 | 27.68 | 2.40 | 2.06 |
| .85 | 29.43 | 2.37 | 2.01 |
| .90 | 31.20 | 2.34 | 1.99 |
| .95 | 32.99 | 2.31 | 1.92 |
| 1.00 | 34.78 | 2.27 | 1.88 |
| 1.05 | 36.57 | 2.23 | 1.83 |
| 1.10 | 38.45 | 2.18 | 1.77 |
| 1.15 | 40.20 | 2.14 | 1.72 |
| 1.20 | 42.03 | 2.09 | 1.67 |
| 1.25 | 43.87 | 2.04 | 1.62 |
| 1.30 | 45.72 | 1.98 | 1.56 |
| 1.35 | 47.69 | 1.92 | 1.50 |
| 1.40 | 49.46 | 1.86 | 1.44 |

There will now be outlined in a series of steps the procedure of determining the eccentricity of the cornea with the second embodiment of this invention.

(1) The patient is seated at the apparatus of FIG. 6 with the head held firmly in position by means of head and chin rest 42, screw 43 being adjusted as necessary.

(2) Occluder 46 is adjusted to obstruct vision of the left eye.

(3) The interchangeable circular target, placed on sleeve 51, is then illuminated by suitable lamps, not shown, and the patient is asked to direct his gaze to the center of the square opening in said target. After adjusting telescope eye piece 48 to the zero position by means of 49, adjusting screws 37, 39 and 40 are then adjusted until the corneal image of said circular target as seen through the telescope is sharly focused and centered about the intersection of the cross lines of reticle 33. The line of sight of the eye and the optical axis of the telescope will then coincide.

(4) If the corneal image of said circular interchangeable target is circular, indicating no apical astigmatism of the cornea, or if previous ophthalmometry indicates no apical astigmatism, telescope 21 is rotated about its optical axis to the zero position, where it is locked in said position by means of lock screw 22, thereby setting fixation rod 26 horizontal. The patient is then asked to direct his gaze nasally to a designated point on said fixation rod, selected so that the rotation of the eye is 25°.

(5) The elliptical corneal image of said circular target is observed with the telescope and said image is sharply focused by adjustment of the telescope eye piece, by rotation of knob 49. The shape of said elliptical image is observed, i.e., the relative length of the major to the minor axis, and said shape is used as a guide to selecting an oval target; the greater the ratio of the major to the minor axis, the greater is the eccentricity designation of the first oval target selected. The circular target is removed and replaced with the selected oval target, its long axis vertical and the flatter aspect of the oval directed temporally. If the corneal image of said oval target is still elliptical and with its major axis oriented as before, said oval target is removed and replaced with one of greater eccentricity designation, or if the corneal image is elliptical but with its major axis oriented trans-meridionally, i.e., 90° to the first orientation, the oval target is removed and replaced with one of smaller eccentricity designation. This procedure of selecting and replacing the oval targets on the basis of the appearance of the corneal image of said targets is repeated until that oval target is selected which results in a circular corneal image, or those two successive oval targets are selected which result in an interchange of the major and minor axes of the elliptical images as one of the oval targets replaces the other. The eccentricity of the semi-meridian measured is then that designated by the oval target which produces a circular corneal image, or the eccentricity is a value estimated between the eccentricities designated by those two successive oval targets resulting in said interchange of the major and minor axes. The eccentricity obtained is recorded.

(6) The oval target used to measure the eccentricity in step (5) is removed from the sleeve 51, rotated 180° about its long axis, and replaced on the sleeve. The patient is then asked to direct his gaze in the opposite direction from step (4), i.e., temporally to the 25° fixation point. The corneal image is observed with the telescope and refocused with the telescope eye piece, if necessary. If the corneal image is not circular, the remainder of the procedure as outlined in step (6) is followed. The eccentricity obtained is recorded.

(6) (Alternative) At the completion of step (5), the oval target on the sleeve 51 is not removed. The telescope is then rotated 180° about its optical axis and the patient is then asked to direct his gaze temporally to the 25° fixation point on fixation rod 26. The remainder of the procedure continues as in (6) above.

(7) The eccentricity values obtained for the two semi-meridans are averaged to obtain the approximate eccentricity for the meridian measured.

(8) At the completion of step (7), and without removing the oval target on the sleeve 51, lock screw 22 is loosened, telescope 21 is then rotated 90° about its optical axis and again locked in position with lock screw 22. The patient is then asked to direct his gaze vertically at the 25° fixation point on fixation rod 26. The corneal image is observed with the telescope and refocused with the telescope eye piece, if necessary. If the corneal image is not circular, the remainder of the procedure outlined in step (6) is followed.

(9) Lock screw 22 is loosened, telescope 21 is then rotated 180° about its optical axis and again locked in position with lock screw 22. The patient is then asked to direct his gaze vertically in the opposite direction at the 25° fixation point on fixation rod 26. The remainder of the procedure follows that of step (8).

(10) The eccentricity values obtained for the two semi-meridians are averaged to obtain the approximate eccentricity for the vertical meridian. Measurements may be made in additional meridians if desired. In general when the cornea has no apical astigmatism, eccentricity in the various meridians will be close, so that the eccentricity of said cornea may be obtained by averaging the various values obtained.

(11) If, following step (3) the image of the circular target is elliptical, indicating apical astigmatism of the cornea, or if previous opthalmometry indicates apical astigmatism, telescope 21 is rotated about its optical axis so that fixation rod 26 coincides in direction with the meridian of least curvature of the cornea as indicated by the direction of the major axis of said elliptical image. The patient is then asked to direct his gaze to the 25° fixation point on fixation rod 26.

The steps following (11) are identical to steps (5) through (10) with the exception that measurements are limited to the principal meridians of the cornea. That oval target which produces a corneal image (formed by the peripheral cornea), which has the same shape and orientation as the elliptical image formed of the circular target by the corneal apex, is the target which indicates the eccentricity of the cornea in the semi-meridian measured.

No tables or graphs are required for the second embodiment of this invention since the eccentricity designation is printed on each oval target.

It was stated previously that this invention might be used to determine the eccentricity of a conicoid surface on a lens as well as on the human cornea. In this case, the modification shown in FIGS. 11 and 12 is used. The chin rest of FIGS. 6 and 8 is substituted by a bracket 54 which is supported on the two vertical rods 42a and 42b, as shown in FIGS. 11 and 12. Centrally of bracket 54 is rigidly mounted a hollow post 55 which rotatably receives a post 56 which carries at its upper end a short arm 57 having an upward projection 58 at its end farthest from its pivot arranged so as to support either a negative conicoid surface lens 59 or a positive conicoid surface lens 60. The position shown in FIG. 12 is to determine the eccentricity of the negative surface 59 whereas, for the determination of the eccentricity of the positive surface 60, the arm 57 must be rotated 180° from the position shown in FIGS. 11 and 12. A circular scale 61 is fixed on post 55 and a coacting pointer 62 is fastened on arm 55 so as to read the angular position of the conicoid surface about 56 as a pivot.

The operation of the modification of FIGS. 11 and 12 is like that already described in connection with the human cornea. When working on the conicoid surface of positive curvature 60, the procedure is like that explained in connection with the human cornea and conforming to the teachings of the diagram of FIG. 4. In working with a conicoid surface of negative curvature as shown at 59, the procedure is the same as described in connection with the steps for use with the human cornea and the diagrammatic explanation is shown in FIG. 5. In the modification of FIGS. 11 and 12, the relation of the conicoid surfaces 59 and 60 to the pivot 56 is approximately such that the conicoid surface may be rotated, to set angle $\gamma$, about a point on its axis of revolution between the center of curvature of the apex of the conicoid surface and a point about 1.5 times its radius of apical curvature. Any variation from this rule is acceptable commercially in this modification, but, if necessary or desirable, this exact relationship may be satisfied by varying the length of arm 57 and by varying the distance between pivot 56 and the vertical support 58 at the end of arm 57.

"Circle" and "ellipse" could be substituted by another regular geometric pattern and its projected image when rotated about a central axis. The terms "circle" and "ellipse" are intended to have this broader meaning and are used to simplify the specification and claims.

What is claimed is:

1. The method of determining the eccentricity, $e$, of a conicoid surface by observing through a telescope an image of a target reflected from said conicoid surface, said telescope having a reticle with two lines crossing at 90° angle on its optical axis, comprising the steps of (1) supporting a circular target concentric to the optical axis of said telescope and normal to said axis; (2) adjusting the position of said telescope so that its optical axis is aligned with the axis of revolution of said conicoid surface and the substantially circular image of said target is centered about the crossing points of said reticle; (3) rotating the conicoid surface an angle $\gamma$ about a point on its axis of revolution between the center of curvature of the apex of said conicoid surface and a point about 1.5 times its radius of apical curvature; (4) rotating said target through an angle $\phi$ from its original position about its diameter which is perpendicular to a meridian plane of said conicoid surface; the direction of $\phi$ being such that a point on said target farthest from said axis of revolution is moved away from said conicoid surface; $\phi$ being that angle of rotation of said circular target from its original position at which said image through said telescope is substantially circular like the image in step (2); and $e$, $\gamma$ and $\phi$ being related by the equation:

$$e = \frac{(1 - \cos \phi)^{\frac{1}{2}}}{\sin \gamma}$$

where $\gamma$ is greater than zero.

2. Apparatus for determining the eccentricity of a conicoid surface comprising a base; means for holding said conicoid surface for oscillation about a point substantially fixed relative to said base; means mounting a telescope on said base directed toward said conicoid surface; means for adjusting and focusing said telescope relative to said conicoid surface to align the optical axis of the telescope with the axis of revolution of said conicoid surface; a circular target; and means for supporting said circular target between said telescope and said conicoid surface; said supporting means including pivot means for orienting said circular target at an angle about its diameter which is perpendicular to a meridian plane of said conicoid surface and with its center on the axis of said telescope; the image of said target on said conicoid surface being reflected to said telescope.

3. Apparatus as defined in claim 2, including means for indicating the turning of the axis of revolution of said conicoid surface a predetermined angle relative to the axis of said telescope.

4. Apparatus as defined in claim 2, including means mounting said telescope for rotation about its axis.

5. Apparatus for determining the eccentricity of a conicoid surface comprising a base; means mounting a telescope on said base adapted to be directed toward said conicoid surface; a circular target; means for supporting said circular target between said telescope and said conicoid surface with the center of said circular target aligned with the optical axis of the telescope; means for adjusting and focusing said telescope relative to said conicoid surface to bring the image of said target formed by said surface into sharp focus; said supporting means including pivot means mounting said target for angular orientation about its diameter which is perpendicular to a meridian plane of said conicoid surface; and in use the image of said target on said conicoid surface being reflected to said telescope.

References Cited

UNITED STATES PATENTS

| | | | |
|---|---|---|---|
| 1,750,931 | 3/1930 | Kellner et al. | 351—10 |
| 1,918,540 | 7/1933 | Hartinger | 351—13 |
| 2,482,669 | 9/1949 | Harding | 351—23 |

DAVID SCHONBERG, Primary Examiner

P. A. SACHER, Assistant Examiner

U.S. Cl. X.R.

351—1, 13, 39, 40